United States Patent
Hisai et al.

(10) Patent No.: US 11,236,814 B1
(45) Date of Patent: *Feb. 1, 2022

(54) PLANETARY GEAR SHAFT LUBRICATION SYSTEM

(71) Applicant: ENPLAS CORPORATION, Kawaguchi (JP)

(72) Inventors: Koki Hisai, Kawaguchi (JP); Kazuki Yamada, Kawaguchi (JP)

(73) Assignee: ENPLAS CORPORATION, Kawaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,878

(22) Filed: Oct. 21, 2020

(51) Int. Cl.
F16H 57/04 (2010.01)

(52) U.S. Cl.
CPC ....... *F16H 57/0482* (2013.01); *F16H 57/043* (2013.01); *F16H 57/045* (2013.01); *F16H 57/0427* (2013.01)

(58) Field of Classification Search
CPC ............ F16H 57/0482; F16H 57/0427; F16H 57/043; F16H 57/045
See application file for complete search history.

(56) References Cited

U.S. PATENT DOCUMENTS

| | | | | |
|---|---|---|---|---|
| 3,469,656 A * | 9/1969 | Futterer | ............... | F16H 57/0482 184/6 |
| 4,271,928 A * | 6/1981 | Northern | ............... | B64C 27/12 184/6.4 |
| 4,480,492 A * | 11/1984 | Fujioka | ............... | F16H 57/0427 184/6.12 |
| 5,480,362 A * | 1/1996 | Tanaka | ............... | F16H 57/0479 475/325 |
| 7,189,183 B2 * | 3/2007 | Fugel | ............... | F16C 33/6677 475/331 |
| 7,384,360 B2 * | 6/2008 | Ploetz | ............... | F16C 21/00 475/159 |
| 8,215,454 B2 * | 7/2012 | Portlock | ............... | F16N 17/06 184/6.12 |
| 8,911,318 B2 * | 12/2014 | Iizuka | ............... | F16H 57/0484 475/159 |
| 9,404,568 B2 * | 8/2016 | Feraud | ............... | F16H 57/045 |
| 2012/0157256 A1 * | 6/2012 | Takeuchi | ............... | F03D 15/10 475/159 |
| 2013/0319006 A1 * | 12/2013 | Parnin | ............... | F01D 25/18 60/805 |
| 2015/0072825 A1 * | 3/2015 | DiMatteo | ............... | F16H 57/0479 475/159 |

* cited by examiner

*Primary Examiner* — Tinh Dang
(74) *Attorney, Agent, or Firm* — Sterne, Kessler, Goldstein & Fox P.L.L.C.

(57) ABSTRACT

A lubrication system for a planetary gear device includes a planetary gear mounted on a planetary gear shaft. The shaft is mounted in a shaft hole that allows the gear to rotate freely about the shaft. Lubricant reservoirs formed as voids or spaces on the inner surface of the shaft hole and outer surface of the shaft provide additional volume for lubricant to lubricate the shaft and shaft hole interface. These lubricant reservoirs extend the lifespan of the lubricant and reduce maintenance requirements of the planetary gear.

11 Claims, 8 Drawing Sheets

US 11,236,814 B1

PLANETARY GEAR SHAFT LUBRICATION SYSTEM

TECHNICAL FIELD

The present disclosure relates to a system lubrication of a planetary gear shaft and planetary gear interface.

BACKGROUND

Planetary gear devices (also known as epicyclic gear devices) are a type of gearing system used to transform rotational motion in machines. These devices are used in many different applications because they are relatively compact and allow for multiple different gear ratio options for transforming rotational motion. Examples of applications of planetary gear devices include motor vehicles (where the term planetary gear box is often used), heavy vehicles (e.g., tractors and excavation equipment), industrial machines, housing equipment. Planetary gear devices may also be reduced in size and used in conjunction with actuators to operate many different mechanism, including, for example, power back doors (PBD) in vehicles, parking brakes in vehicles, power windows in vehicles, electric shutters or electric blinds for installation and use in vehicles or buildings, such as homes or office buildings.

As discussed in detail below, planetary gear devices include several different gears that mesh with each other and work together to create a gear ratio that transforms input rotational motion to a desired output rotational motion. The different gears are mounted on gear shafts using a shaft hole that is located at the center of each gear. The shaft holes and corresponding shafts are sized such that there is a minimal gap between the outer diameter of the shaft and the inner diameter of the shaft hole. This reduces undesirable movement of the gears in the planetary gear device and therefore minimizes excess gear wear, noise, and vibration. However, the shaft and shaft hole interface must be lubricated to reduce wear between the shaft and shaft hole. Lubrication is typically applied during assembly by coating the shaft and shaft hole with a lubricant such as oil or grease before inserting the shaft into the shaft hole. However, the minimal volume of the gap between the shaft and shaft hole results in a correspondingly small amount of lubricant being retained to lubricate the shaft and shaft hole after assembly. This lubricant eventually dissipates (e.g., by leakage or by breaking down) during use of the planetary gear device. Reapplying the lubricant to these elements requires disassembly of the planetary gear device, which is often a time intensive process that is difficult for an end user to accomplish. Accordingly, there is a need to improve lubricant retention after assembly to reduce maintenance requirements and improve planetary gear device performance.

BRIEF SUMMARY

An aspect of a lubrication system for a planetary gear device includes a planetary gear shaft and a planetary gear comprising a shaft hole disposed at a radial center of the planetary gear. The planetary gear shaft is rotatably disposed in the shaft hole such that an outer surface of the planetary gear shaft and an inner surface of the shaft hole are in contact. A lubricant reservoir is disposed on one of the outer surface of the planetary gear shaft and the inner surface of the shaft hole, wherein the lubricant reservoir defines a space that is configured to contain a lubricant, and wherein the lubricant reservoir is configured to allow the lubricant to escape the lubricant reservoir and lubricate the outer surface and the inner surface.

A further aspect of a lubrication system for a planetary gear device includes a planetary gear shaft and a planetary gear comprising a shaft hole disposed at a radial center of the planetary gear. The planetary gear shaft is rotatably disposed in the shaft hole such that an outer surface of the planetary gear shaft and an inner surface of the shaft hole are in contact. A lubricant reservoir is disposed on one of the outer surface of the planetary gear shaft and the inner surface of the shaft hole, wherein the lubricant reservoir defines a space that is configured to contain a lubricant, and wherein the lubricant reservoir is configured to allow the lubricant to escape the lubricant reservoir and lubricate the outer surface and the inner surface. The lubricant reservoir is disposed at a circumferential position of minimum lateral loading on either the outer surface of the planetary gear shaft or the inner surface of the shaft hole.

BRIEF DESCRIPTION OF THE DRAWINGS/FIGURES

The accompanying drawings, which are incorporated herein and form part of the specification, illustrate aspects of the present disclosure and, together with the description, further serve to explain the principles of the disclosure and to enable a person skilled in the relevant art to make and use the disclosure.

DETAILED DESCRIPTION

The present disclosure will now be described in detail with reference to embodiments thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

Planetary gear devices may rely on proper lubrication to prevent excess wear and ensure proper operation. Extending lubrication lifespan is important to reduce effort that may be required for maintenance, to prolong intervals between instances of any required maintenance, and to extend the operational life of the planetary gear device. This is most relevant in planetary gear devices that are not actively lubricated through systems that actively circulate lubricant through the planetary gear device. An active lubrication system may increase a likelihood that the planetary gear device is sufficiently lubricated, but it may also require additional components (e.g., pumps, lubricant passages, lubricant tanks, etc.) that may add cost, complexity, and weight to a planetary gear device. Thus, there is a need for systems and methods of extending lubrication interval in a planetary gear device, particularly in planetary gear devices that are not actively lubricated. Aspects of the present disclosure may yield significant improvements to planetary gear devices without requiring a system for active lubrication.

An aspect of a lubrication system for a planetary gear device per the present disclosure includes a planetary gear shaft and a planetary gear comprising a shaft hole disposed at a radial center of the planetary gear. The planetary gear shaft may be rotatably disposed in the shaft hole such that an outer surface of the planetary gear shaft and an inner surface of the shaft hole are in contact. A lubricant reservoir may be disposed on one of the outer surface of the planetary gear shaft and the inner surface of the shaft hole. The lubricant reservoir may define a space that is configured to contain a lubricant, and the lubricant reservoir may be configured to allow the lubricant to escape the lubricant reservoir and lubricate the outer surface and the inner surface. As will be discussed below, this system provides advantages that address the need to extend lubrication intervals.

Figure 1:
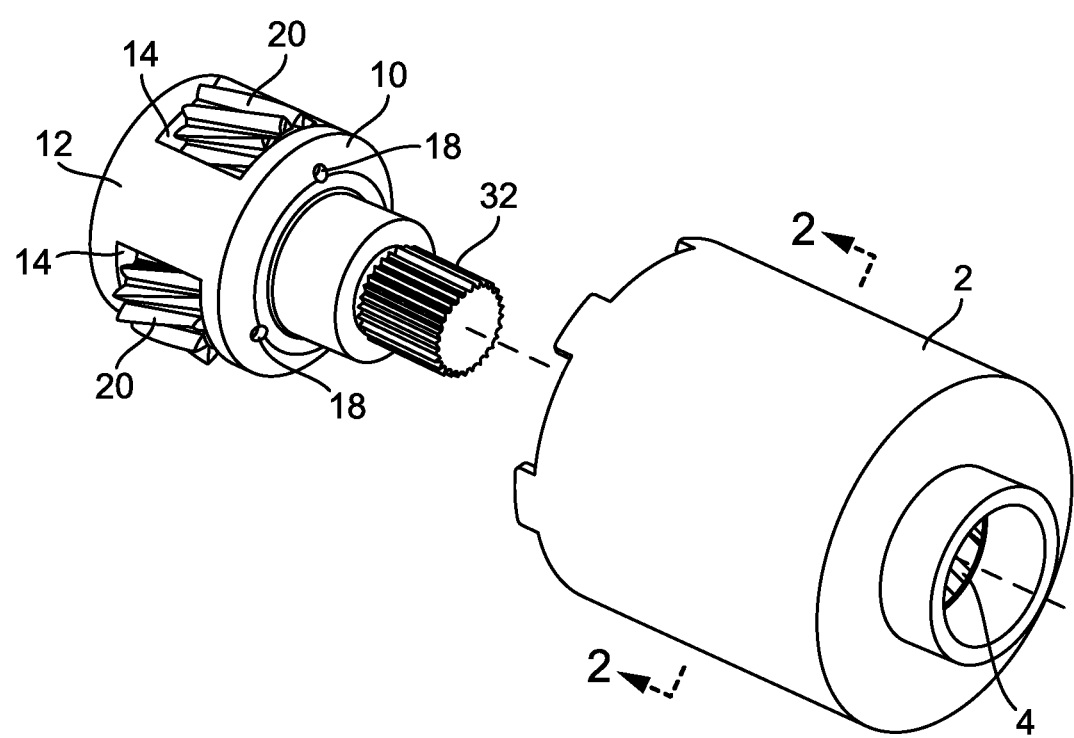
FIG. 1 is a perspective view of a planetary gear device according to aspects of the disclosure.

FIG. 1 shows a partially exploded view of a planetary gear device 1. A cylindrical housing 2 is shown along with a carrier 10 that has been removed from housing 2. Two planetary gears 20 are visible mounted in carrier 10. Each planetary gear 20 is rotatably mounted in carrier 10. There may be at least one planetary gears 20 mounted in carrier 10. In some aspects there may be two, three, four, or more planetary gears 20 rotatably mounted in carrier 10. Carrier 10 includes openings 14 in outer surface 12. Openings 14 may be designed as gaps in the circumference of outer surface 12 that correspond to the positions of planetary gears 20. Planetary gears 20, in turn, may be mounted such that teeth 23 of planetary gears 20 extend through opening 14 beyond outer surface 12 of carrier 10 in a radial direction.

Figure 2:
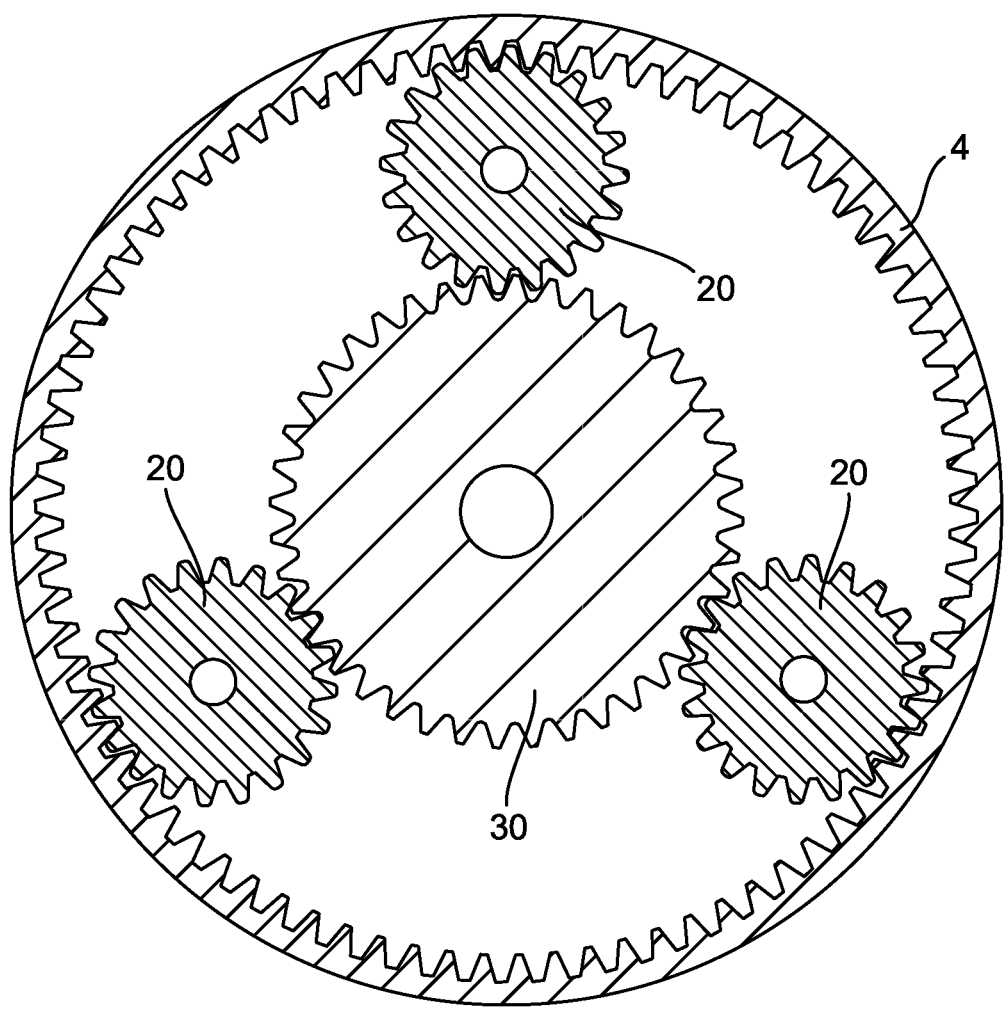
FIG. 2 is a cross section of a planetary gear device as shown in FIG. 1 according to aspects of the disclosure.

Also shown in FIG. 1 is the output shaft 32. As shown in FIG. 2, sun gear 30 is inserted into a sun gear opening in the center of carrier 10 such that the teeth of sun gear 30 mesh with the teeth 23 of planetary gear 20. In the aspect shown in FIG. 1, output shaft 32 is embodied in one piece with a carrier 10. It has teeth that are integrally formed and configured to output the rotational motion transmitted from the sun gear 30.

Figure 3:
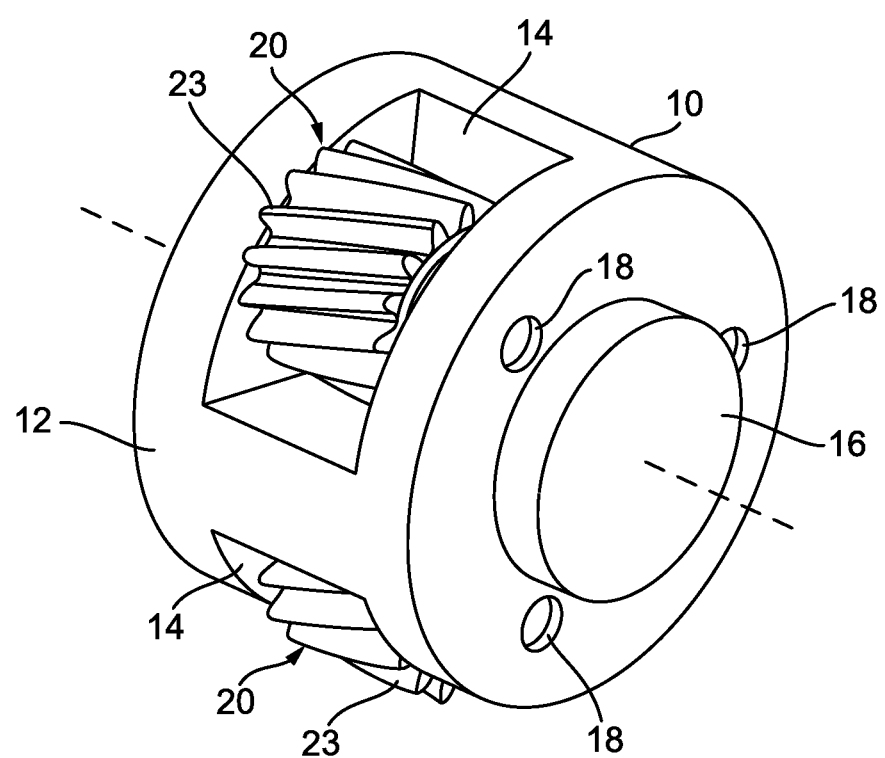
FIG. 3 is a perspective view of a carrier of a planetary gear device according to aspects of the disclosure.

As shown by the dashed axis line, carrier 10 is inserted into housing 2 such that the axis of carrier 10 and the axis of housing 2 are aligned. As shown in FIG. 3, this aspect of carrier 10 includes a boss 16 that extends from the side of carrier 10 opposite the sun gear opening. Boss 16 is received by a corresponding opening in housing 2 or other supporting structure and allows carrier 10 to rotate within housing 2.

FIG. 2 shows a cross section view of housing 2 when the planetary gear device is fully assembled. This view shows the final gear element of planetary gear device 1: internal gear 4. In this aspect, internal gear 4 is fixed to the inner wall of housing 2. As shown in FIG. 2, once assembled sun gear 30 located at the center of housing 2 is meshed with planetary gears 20, which are in turn meshed with internal gear 4.

All of the elements of planetary gear device 1 discussed above may be manufactured from an suitable material. For example, elements may be manufactured from suitable metals or plastics. In some aspects, some or all of the elements discussed above are made from synthetic resins including an ultrapolymer polyethylene (UHPE), polyphenylene sulfide (PPS), polyarylate (PAR), polyacetal (POM), or polyamide (PA), polycarbonate (PC), polybutylene terephthalate (PBT), polyether sulfone (PES), polyether ether ketone (PEEK), polyacetal (POM).

Applications of aspects of planetary gear device 1 include motor vehicles (where the term planetary gear box is often used), heavy vehicles (e.g., tractors, construction, equipment, and excavation equipment), industrial machines, and household equipment, for example. Some aspects of planetary gear device 1 may also be reduced in size and weight, enabling their use in smaller applications. Compact and lightweight aspects of planetary gear device 1 may be used in conjunction with actuators to operate many different mechanisms used in vehicles, including, for example, a power back door (PBD), also known as a power lift gate, power rear hatch, or a power trunk lid; parking brakes, and power windows; and electric shutters or electric blinds for installation and use in vehicles or in buildings (e.g., homes and office buildings).

Planetary gear device 1 as shown in FIGS. 1 and 2 can function in several different ways. For example, providing a rotational input to sun gear 30 and allowing carrier 10 to rotate freely will result in a rotational output being produced housing 2, because internal gear 4 is fixed to housing 2, as shown in the accompanying drawings. The gear ratio that the rotational motion experiences is governed by the number of teeth each gear member has in planetary gear device 1. Changing which components are free to rotate and which components are the input and output alters the gear ratio and how the rotational motion is transformed by planetary gear device 1. The lubrication systems and methods discussed below are applicable to any operational method or configuration of planetary gear devices 1.

Figure 4:
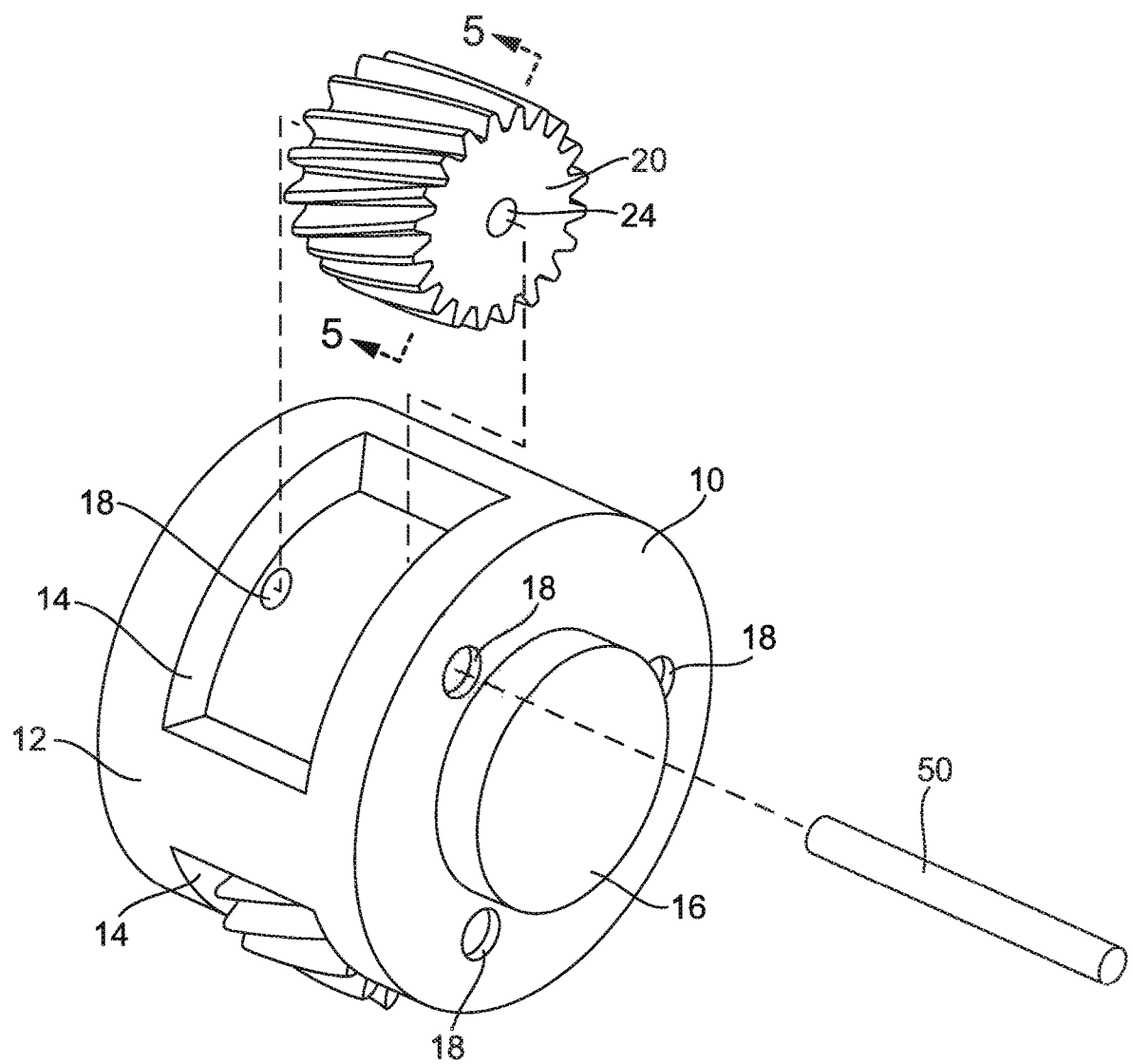
FIG. 4 is an exploded view of a carrier of a planetary gear device according to aspects of the disclosure.

As best shown in FIGS. 3 and 4, planetary gears 20 are rotatably mounted in carrier 10 on planetary gear shafts 50. Each planetary gear shaft 50 is mounted on a shaft hole 24 that is disposed at the center of planetary gear 20 and extends through planetary gear 20 from top surface 21 to bottom surface 22 in the axial direction. As shown in FIG. 4, planetary gear shaft 50 is in turn mounted planetary gear shaft holes 18 found in carrier 10. Planetary gear shaft 50 may be free to rotate in planetary gear shaft hole 18 or may be fixed in planetary gear shaft holes 18 using an interference fit or through pinning, welding, or other suitable techniques.

As shown in FIGS. 3 and 4, planetary gear shafts 50 are formed in cylinder shapes. Shaft hole 24 is a circular hole that has a diameter that corresponds to the outer diameter of planetary gear shaft 50. The tolerances between the outer diameter of planetary gear shaft 50 and the inner diameter of shaft hole 24 may be relatively small to reduce any motion of planetary gear shaft 50 in shaft hole 24 relative to planetary gear 20. For example, in some aspects the difference in these two diameters may be between 0.005 inches and 0.0002 inches.

This tolerance may result in reducing a gap between planetary gear shaft 50 and shaft hole 24. For example, in some aspects this gap may be less than 0.001 inches radially. The resulting annular shape of the gap further reduces available volume for the required lubricant to occupy between planetary gear shaft 50 and shaft hole 24. Although this volume is sufficient for the lubricant to function, as the lubricant dissipates during use, there may be less excess lubricant to continue lubricating shaft hole 24 and planetary gear shaft 50.

Where this may be a problem, a solution may be to include one or more lubricant reservoirs 60 on either or both of outer surface 51 of planetary gear shaft 50 or inner surface 25 of shaft hole 24, in some aspects of the present disclosure. Lubricant reservoirs 60 may be voids or spaces that extend into their corresponding surface (i.e., radially outward for inner surface 25 and radially inward for outer surface 51). They may create more available volume for lubricant between outer surface 51 and inner surface 25. Since lubricant reservoirs 60 may be open toward the gap between outer surface 51 and inner surface 25, lubricant may thereby escape from lubricant reservoir 60 to lubricate outer surface 51 and inner surface 25. Lubricant reservoirs 60 may be formed in a variety of shapes and distributed across various locations on outer surface 51 and inner surface 25. The shape, size, and distribution of lubricant reservoirs 60 may be designed to meet a given lubrication need. For example, if greater lubrication retention is needed, more lubricant reservoirs 60 may be added, and/or existing lubricant reservoirs 60 may be increased in volume. Examples of some possible configurations of lubricant reservoirs 60 are discussed below.

Figure 5:
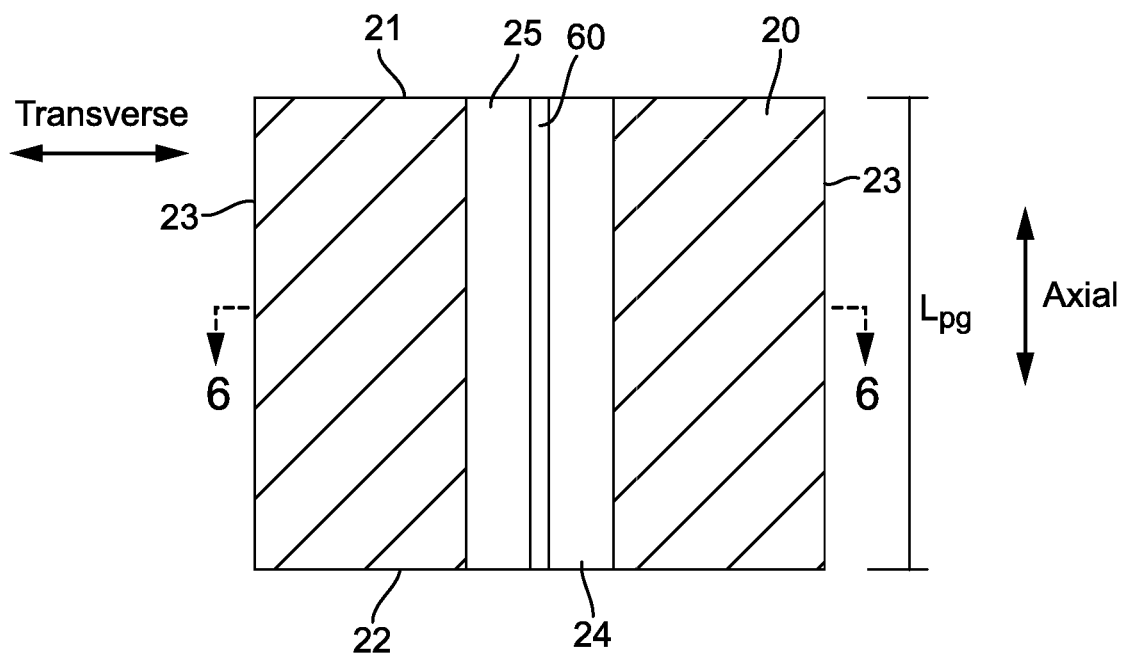
FIG. 5 is a cross section of a planetary gear according to aspects of the disclosure.
Figure 6:
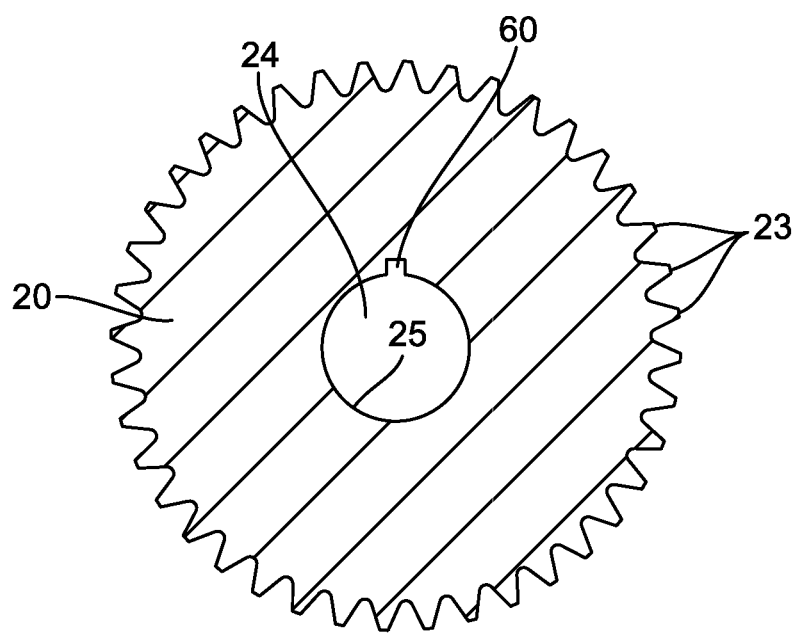
FIG. 6 is a cross section of a planetary gear according to aspects of the disclosure.

As shown in FIGS. 5 and 6, in an aspect, lubricant reservoirs 60 may be placed on inner surface 25 of shaft hole 24. In the aspect shown in FIGS. 5 and 6, lubricant reservoir 60 is shaped as a rectangular groove that extends in the axial direction of planetary gear 20. This aspect of lubricant reservoir 60 is shown extending symmetrically from a midpoint of planetary gear 20 the entire length $L_{pg}$ of planetary gear 20. This configuration may be desirable to provide lubricant along the length of shaft hole 24. However, lubricant reservoir 60 does not need to extend along the entire length of shaft hole 24. For example, lubricant reservoir 60 may extend along only one-quarter, one-half, three-quarters, or any desired portion of length $L_{pg}$. Furthermore, it is not necessary for lubricant reservoir 60 to be symmetrically disposed along planetary gear 20. For example, lubricant reservoir 60 may extend for a length of one-half $L_{pg}$ and be disposed only in the upper half of shaft hole 24, according to some aspects.

FIG. 6 shows a top cross-sectional view of the aspect of planetary gear 20 shown in FIG. 5. As seen in FIG. 6, this aspect of lubricant reservoir 60 extends radially outwards from inner surface 25 in an approximately rectangular cross section. However, the cross section of lubricant reservoir 60 may be varied as desired depending on lubrication retention needs and other design considerations, such as structural integrity. For example, the walls of lubricant reservoir 60 do not need to be parallel, in some aspects. Instead, for example, they may extend radially outwards, forming a wedge shape or arc shape when viewed in cross section. Other configurations of the walls of lubricant reservoir 60 may, for example, result in square, rectangular, circular, triangular, hexagonal or other cross-section shapes of lubricant reservoir 60. Furthermore, the specific depth that lubricant reservoir 60 extends outwards can be varied based on a desired lubricant volume, structural integrity, and other design considerations.

The aspects of lubricant reservoir discussed in the preceding paragraphs extend axially along planetary gear 20. However, other aspects of lubricant reservoir 60 may extend at any desired angle with respect to the axial direction. The vertical direction in FIGS. 5 and 6 represents the axial direction for purposes of the depicted aspects. For example, aspects of lubricant reservoir 60 similar to those shown in FIGS. 5 and 6 may extend at a forty-five degree angle to the axial direction, thus forming a spiral pattern on inner surface 25.

Figure 7:
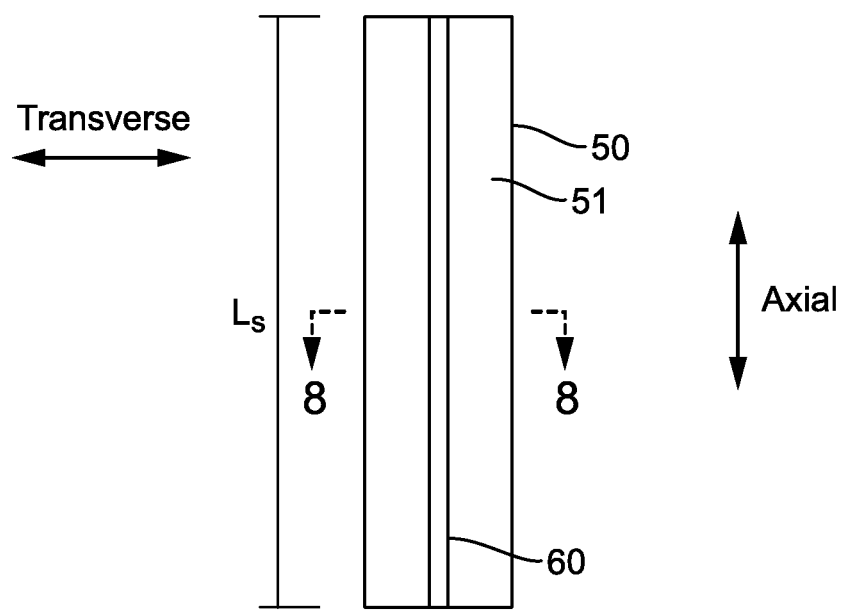
FIG. 7 is a side view of a planetary gear shaft according to aspects of the disclosure.
Figure 8:
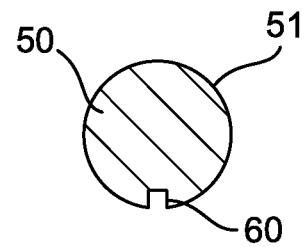
FIG. 8 is a cross section of a planetary gear shaft according to aspects of the disclosure.

FIGS. 7 and 8 show an aspect of lubricant reservoir 60 that is similar in shape to the aspect of FIGS. 5 and 6, but is instead formed on outer surface 51 of planetary gear shaft 50. The discussion in the preceding paragraphs applies also to this aspect of lubricant reservoir 60. However, instead of extending radially outwards, this aspect extends radially inwards into planetary gear shaft 50, as best seen in FIG. 8. Similar to the other aspects disclosed herein, this aspect of lubricant reservoir extends along the total length Ls of planetary gear shaft 50. The length of lubricant reservoir 60 may be changed as discussed above. For example, in aspects where planetary gear shaft 50 is fixed to carrier 10, lubricant reservoir 60 may only extend along the portion of planetary gear shaft 50 that is in contact with shaft hole 24 because that is the only portion of planetary gear shaft 50 that is in rotating contact with planetary gear 20. Specifically, lubricant reservoir 60 may extend symmetrically from the midpoint of planetary gear shaft 50 but may stop short of the ends of planetary gear shaft 50, leaving the end portions of planetary gear shaft 50 that are anchored in carrier 10 unmodified.

Figure 9:
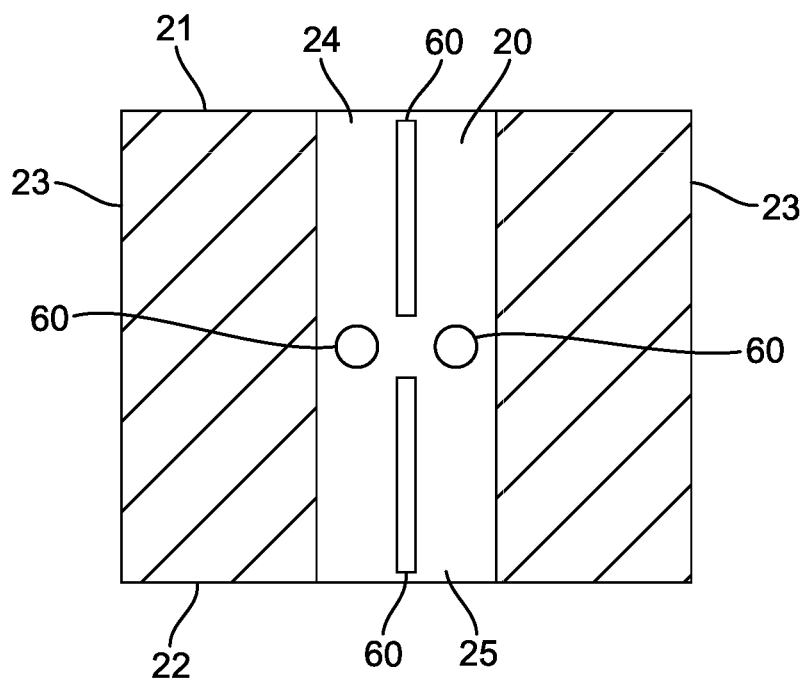
FIG. 9 is a cross section of a planetary gear according to aspects of the disclosure.
Figure 10:
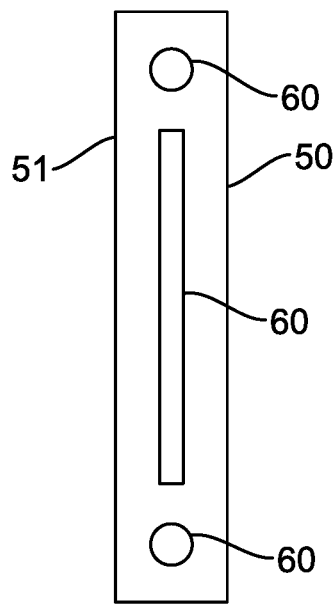
FIG. 10 is a side view of a planetary gear shaft according to aspects of the disclosure.

The previous aspects of lubricant reservoir 60 have been single groove-type shapes. However, lubricant reservoir 60 can be configured as any desired shape. Furthermore, multiple lubricant reservoirs 60 of similar or different shapes may be distributed across inner surface 24 and outer surface 51. For example, as shown in FIG. 9, there may be four lubricant reservoirs 60 that comprise two axially-oriented grooves and two circular holes on inner surface 24. FIG. 10 shows another aspect of lubricant reservoirs 60 that includes a single axially-oriented groove and two circular holes in outer surface 51. Lubricant reservoir 60 may be formed in a variety of other shapes, including circles, squares, rectangles, triangles, ellipses, and other curves or polygonal shapes. These shapes may be chosen to determine lubricant volume, for ease of manufacturing, or for any other reason.

The preceding aspects illustrated lubricant reservoirs 60 located in one area of inner surface 24 and outer surface 51. However, multiple lubricant reservoirs 60 may be distributed around the circumference of inner surface 24 or outer surface 51 as desired. For example, lubricant reservoirs 60 may be spaced around the circumference of the corresponding surface symmetrically (e.g., with 30, 60, 90, or 180 degrees of separation between each location containing one or more lubricant reservoir 60) or unevenly. Distributing multiple lubricant reservoirs 60 around inner surface 24 and outer surface 51 may be desirable for several reasons. First, a distribution of lubricant reservoirs 60 provides more lubricant at different locations, and thus provides a more even distribution of lubricant. Second, multiple, distributed lubricant reservoirs 60 can be made shallower for the same total lubricant volume as a single lubricant reservoir 60, which may improve structural integrity of planetary gear 20 and planetary gear shaft 50, due to less material being removed from a given location. Third, multiple lubricant reservoirs 60 can be distributed symmetrically around the circumference of inner surface 24 and outer surface 51. This improves the balance of weight distribution of planetary gear 20 and planetary gear shaft 50, which is often particularly important for relatively smooth operation of rotating elements.

Figure 11:
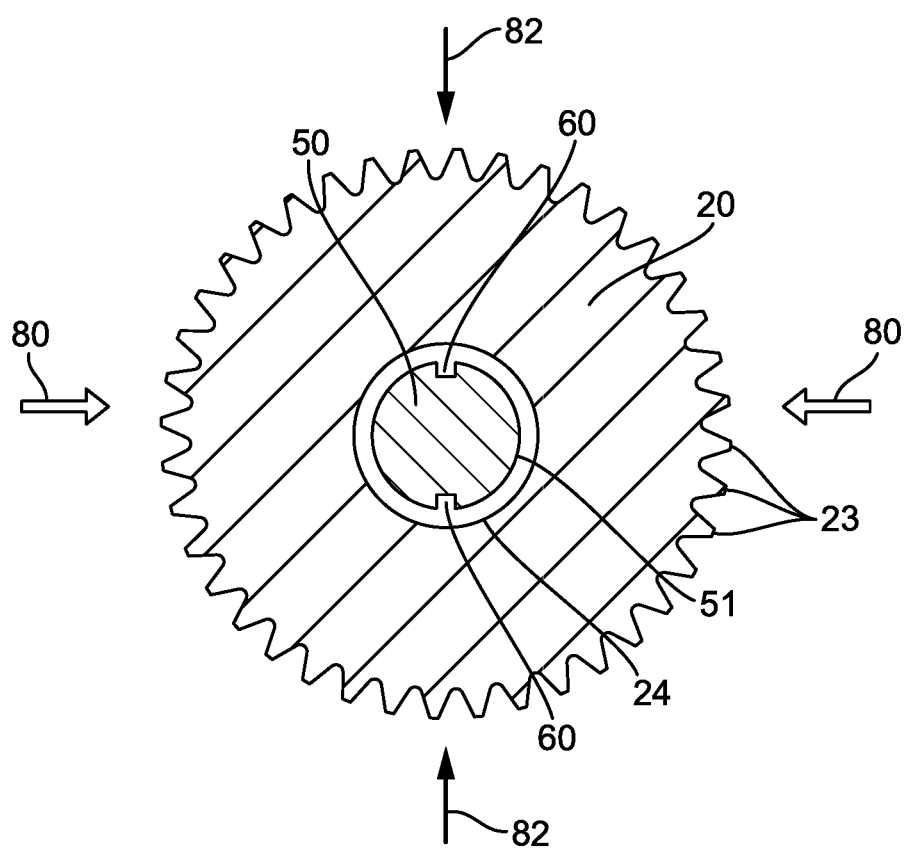
FIG. 11 is a cross section view of a planetary gear according to aspects of the disclosure.

In some aspects, the circumferential locations of lubricant reservoirs 60 may be selected to coincide with the locations of lowest lateral loading (minimum lateral loading) between planetary gear 20 and planetary gear shaft 50. Lateral loading is the force imposed on either planetary gear 20 or planetary gear shaft 50 that is perpendicular to the axis of rotation. During operation, planetary gear 20 and planetary gear shaft 50 experience the highest lateral loading (maximum lateral loading) at the points that lie on the circle connecting the planetary gear shafts 50. There are two maximum loading points (spaced 180 degrees apart) because a planetary gear device may be rotated in two directions, each of which corresponds to one of the maximum loading points. These highest lateral loading points are indicated by arrows 80 in FIG. 11. The corresponding locations of lowest lateral loading are spaced 90 degrees from the highest loading points and are shown by arrows 82. As seen in FIG. 11, for example, two lubricant reservoirs 60 are disposed on planetary gear shaft 50 at locations that correspond to the lowest loading points. These locations are relevant for systems where planetary gear shaft is fixed relative to carrier 10. In some aspects, locating lubricant reservoirs 60 at the lowest lateral load locations may considerably reduce noise, vibration, and/or wear caused by lubricant reservoirs 60.

A method of manufacturing aspects of the lubrication system discussed above includes a step of determining the size, shape, number, and placement of lubricant reservoirs on planetary gear 20 and planetary gear shaft 50. According to some aspects, available volume for lubricant may be increased by creating more and/or larger lubricant reservoirs 60. As part of a manufacturing process, this may be achieved by increasing the volume of individual lubricant reservoirs 60 and/or increasing the number of lubricant reservoirs 60. A desired total volume/number of lubricant reservoirs 60 may be balanced with concerns of structural integrity, weight distribution, vibration, noise, and ease of manufacturing. In some aspects, it may be desirable to place lubricant reservoirs 60 on both planetary gear 20 and planetary gear shaft 50 to reduce the structural impact a given volume of lubricant reservoirs 60 has on any single component. After the desired lubricant reservoirs 60 are determined, they may be formed as part of their respective components (i.e., planetary gear 20 or planetary gear shaft 50). For example, if planetary gear 20 is made of a synthetic resin formed using a mold, lubricant reservoirs 60 may be incorporated into the mold such that they are formed in planetary gear 20 as part of the molding process. In other aspects, lubricant reservoirs 60 may be formed in a second manufacturing step after initial formation of planetary gear 20 or planetary gear shaft 50. For example, this additional forming step may include a machining process that removes material to form lubricant reservoirs 60. In a further assembly step, planetary gear device 1 may be assembled from its constituent parts, including planetary gear 20 and planetary gear shaft 50 containing lubricant reservoirs 60. As part of this assembly step, or in another step, lubricant reservoirs 60 may be filled with suitable lubricant before assembly.

Some advantages of aspects discussed above may include an extended lubrication lifetime before requiring reapplication of lubricant in a planetary gear device. This advantage is especially relevant to planetary gear devices 1 without active lubrication systems. This extension of lubrication lifespan has the advantage of being able to be retrofitted on existing planetary gear devices without minimal effort. These aspects also do not increase assembly difficulty minimal effort needed to apply additional lubricant to lubricant reservoirs 60. Furthermore, an advantage of aspects discussed above is that the lubrication system does not require special lubricants or maintenance procedures—it is compatible with existing lubricants and maintenance.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A lubrication system for a planetary gear device, comprising:
    a planetary gear shaft;
    a planetary gear comprising a shaft hole disposed at a radial center of the planetary gear, wherein the planetary gear shaft is rotatably disposed in the shaft hole such that an outer surface of the planetary gear shaft and an inner surface of the shaft hole are in contact; and
    a lubricant reservoir disposed on the outer surface of the planetary gear shaft and formed as a groove that is oriented in an axial direction of the planetary gear shaft, wherein the groove extends along an entire length of the planetary gear shaft in the axial direction, wherein no lubricant reservoir is disposed on the inner surface of the shaft hole,
    wherein the lubricant reservoir defines a space that is configured to contain a lubricant, and
    wherein the lubricant reservoir is configured to allow the lubricant to escape the lubricant reservoir and lubricate the outer surface and the inner surface.

2. The lubrication system of claim 1, wherein the lubricant reservoir is disposed at a circumferential position of minimum lateral loading on either the outer surface of the planetary gear shaft or the inner surface of the shaft hole.

3. A planetary gear device, comprising
    a gear housing;
    an internal gear fixed to and disposed inside the housing;
    a carrier rotatably mounted inside the housing;
    a planetary gear rotatably mounted in the carrier on a planetary gear shaft, wherein the planetary gear meshes with the internal gear;

a sun gear disposed inside the carrier, wherein the sun gear meshes with the planetary gear; and a lubrication system as recited in claim 1.

4. A lubrication system for a planetary gear device, comprising:

a planetary gear shaft;

a planetary gear comprising a shaft hole disposed at a radial center of the planetary gear; and a lubricant reservoir disposed on one of the outer surface of the planetary gear shaft and the inner surface of the shaft hole, wherein the lubricant reservoir defines a space that is configured to contain a lubricant, wherein the lubricant reservoir is not connected to a lubrication system, and wherein the lubricant reservoir is configured to allow the lubricant to escape the lubricant reservoir and lubricate the outer surface and the inner surface.

5. The lubrication system of claim 4, further comprising a plurality of lubricant reservoirs, wherein at least one lubricant reservoir is disposed on each of the outer surface of the planetary gear shaft and the inner surface of the shaft hole, and wherein the lubricant reservoirs are not connected to the lubrication system.

6. The lubrication system of claim 4, wherein the lubricant reservoir is disposed on the outer surface of the planetary gear shaft and is not disposed on the inner surface of the shaft hole.

7. The lubrication system of claim 6, wherein the lubricant reservoir is formed as a groove that is oriented in an axial direction of the planetary gear shaft, and wherein the groove extends only a portion of a total length of the planetary gear shaft in the axial direction.

8. The lubrication system of claim 6, wherein the lubricant reservoir is formed as a groove that is oriented in an axial direction of the planetary gear shaft, and wherein the groove extends along an entire length of the planetary gear shaft in the axial direction.

9. The lubrication system of claim 5, wherein at least one of the lubricant reservoirs is formed as a groove that is oriented in an axial direction of the planetary gear shaft, and wherein the groove extends only a portion of a total length of the planetary gear shaft in the axial direction, and wherein at least one of the lubricant reservoirs is formed as a circular hole.

10. The lubrication system of claim 5, wherein each of the plurality of lubricant reservoirs is disposed at the circumferential position of minimum lateral loading on either the outer surface of the planetary gear shaft or the inner surface of the shaft hole.

11. A planetary gear device, comprising a gear housing;

an internal gear fixed to and disposed inside the housing;

a carrier rotatably mounted inside the housing;

a planetary gear rotatably mounted in the carrier on a planetary gear shaft, wherein the planetary gear meshes with the inner gear;

a sun gear disposed inside the carrier, wherein the sun gear meshes with the planetary gear; and a lubrication system as recited in claim 4.

* * * * *